(12) United States Patent
Nishimura et al.

(10) Patent No.: US 9,381,944 B2
(45) Date of Patent: Jul. 5, 2016

(54) UPPER VEHICLE-BODY STRUCTURE OF AUTOMOTIVE VEHICLE PROVIDED WITH SUN ROOF

(71) Applicant: MAZDA MOTOR CORPORATION, Hiroshima (JP)

(72) Inventors: Yoshikazu Nishimura, Hiroshima (JP); Hideaki Hoshuyama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/713,955

(22) Filed: May 15, 2015

(65) Prior Publication Data

US 2015/0367794 A1 Dec. 24, 2015

(30) Foreign Application Priority Data

Jun. 18, 2014 (JP) ................................ 2014-124930

(51) Int. Cl.
*B62D 25/06* (2006.01)
*B62D 25/04* (2006.01)

(52) U.S. Cl.
CPC ............... *B62D 25/04* (2013.01); *B62D 25/06* (2013.01)

(58) Field of Classification Search
CPC .......... B60J 10/12; B60J 21/157; B60J 25/02; B60J 25/06

USPC ................. 296/216.06–216.08, 203.03, 210, 296/187.12

See application file for complete search history.

(56) References Cited

U.S. PATENT DOCUMENTS

| 5,873,618 A | * | 2/1999 | Ejima | .................... | B62D 25/06 296/30 |
| 8,770,652 B2 | * | 7/2014 | Hong | .................... | B62D 25/06 296/187.05 |
| 2013/0082484 A1 | * | 4/2013 | Wagner | .................. | B62D 25/06 296/210 |
| 2013/0119647 A1 | | 5/2013 | Tanaka et al. | | |

FOREIGN PATENT DOCUMENTS

JP 2006-327284 A 12/2006
JP 2010-188797 A 9/2010

* cited by examiner

*Primary Examiner* — Dennis H Pedder
(74) *Attorney, Agent, or Firm* — Studebaker & Brackett PC (57) ABSTRACT

A connecting reinforcement interconnecting a fixing plate which is a window-frame member to reinforce a sun roof opening and a roof side rail at a position corresponding to a center pillar is provided. The connecting reinforcement is positioned forward of the roof reinforcement, has a specified second sectional shape, and extends in a vehicle width direction roughly horizontally. A rear edge portion of the connecting reinforcement and a front edge portion of the roof reinforcement are connected to each other, and an inboard edge portion of the connecting reinforcement and a front edge portion of the roof reinforcement are connected via the fixing plate.

9 Claims, 8 Drawing Sheets

UPPER VEHICLE-BODY STRUCTURE OF AUTOMOTIVE VEHICLE PROVIDED WITH SUN ROOF

BACKGROUND OF THE INVENTION

The present invention relates to an upper vehicle-body structure of an automotive vehicle provided with a sun roof, and more specifically relates to the upper vehicle-body structure of the automotive vehicle provided with the sun roof, in which a sun roof opening is provided at a roof panel arranged between a pair of right-and-left roof side rails extending in a vehicle longitudinal direction, right-and-left side edge portions of the sun roof opening are spaced apart from the right-and-left roof side rails, respectively, a center pillar extends downward from the roof side rail, a rear edge portion of the sun roof opening is positioned rearward from the center pillar, and a roof reinforcement extending in a vehicle width direction and having a specified first sectional shape is provided at a position just behind the sun roof opening.

In general, it is preferable in the automotive vehicle provided with the sun roof that the sun roof opening be opened up to a position just above a head portion of a passenger seated in a front seat. Meanwhile, the best position of the enter pillar may be preferably set at a position just beside a seat back of the front seat or slightly forward of this position for the purpose of protection of the passenger against a vehicle side collision.

Herein, since it is difficult to interconnect respective upper end portions of the right-and-left center pillars straightly in the vehicle width direction via the roof reinforcement provided at a lower face of the roof panel and extending in the vehicle width direction in order to meet the above-descried conditions, a conventional structure is configured such that an end portion, in the vehicle width direction, of the roof reinforcement is formed to bend so as to be located as close as possible to the upper end portion of the center pillar, and the upper end portion of the center pillar is connected to this bending end portion of the roof reinforcement (see U.S. Patent Application Publication No. 2013/0119647 A1). That is, the end portion of the roof reinforcement having an uneven sectional shape is formed to bend forward and downward. This structure is superior in transmitting a load via the portion having the uneven sectional shape which includes ridgelines and grooves and therefore has a higher rigidity than a portion having an even sectional shape, but the bending rigidity may be insufficient because of an existence of the bending portion.

Meanwhile, as disclosed in Japanese Patent Laid-Open Publication No. 2010-188797, the end portion of the roof reinforcement having a groove portion extends to a front portion of the upper end portion of the center pillar via the bending portion.

The structures disclosed in the above-described patent documents are superior in increasing the rigidity of the connection of the upper end portion of the center pillar and the roof reinforcement, which are offset from each other in the vehicle longitudinal direction, but there is a problem in that in a case in which the distance, in the vehicle width direction, between the roof side rail and the fixing plate as a sun-roof frame member is large, the above-described bending portion may cause deformation easily.

Further, Japanese Patent Laid-Open Publication No. 2006-327284 discloses a structure in which the roof reinforcement provided at the lower face of the roof panel extends in the vehicle width direction roughly horizontally, and the end portion, in the vehicle width direction, of the roof reinforcement and the upper end portion of the center pillar are connected via a gusset. However, the conventional structure disclosed in this patent document has a problem in that the efficiency of transmission of the side-collision load is inferior because the center pillar and the gusset are offset from each other in the vehicle longitudinal direction.

SUMMARY OF THE INVENTION

Accordingly, an object of the present invention is to provide an upper vehicle-body structure of an automotive vehicle provided with a sun roof which can attain a light-weight and high-rigidity performance, and particularly can increase the vehicle-width-direction rigidity against the side collision, by effectively connecting the upper end portion of the center pillar and the end portion, in the vehicle width direction, of the roof reinforcement which are even offset from each other in the vehicle longitudinal direction.

This object is solved by the upper vehicle-body structure of the automotive vehicle provided with the sun roof according to the present invention of the independent claim. Preferred embodiments of the present invention are subject of the other dependent claims.

The present invention is an upper vehicle-body structure of an automotive vehicle provided with a sun roof, in which a sun roof opening is provided at a roof panel arranged between a pair of right-and-left roof side rails extending in a vehicle longitudinal direction, right-and-left side edge portions of the sun roof opening are spaced apart from the right-and-left roof side rails, respectively, a center pillar extends downward from the roof side rail, a rear edge portion of the sun roof opening is positioned rearward from the center pillar, and a roof reinforcement extending in a vehicle width direction and having a specified first sectional shape is provided at a position just behind the sun roof opening, the upper vehicle-body structure comprising a connecting reinforcement interconnecting a fixing plate which is a window-frame member to reinforce the sun roof opening and the roof side rail at a position corresponding to the center pillar, wherein the connecting reinforcement is positioned forward of the roof reinforcement, has a specified second sectional shape, and extends in the vehicle width direction roughly horizontally, a rear edge portion of the connecting reinforcement and a front edge portion of the roof reinforcement are connected to each other, and an inboard edge portion of the connecting reinforcement and the front edge portion of the roof reinforcement are connected via the fixing plate.

According to the present invention, since the roof reinforcement and the connecting reinforcement are arranged straightly in the vehicle width direction, the connecting reinforcement and the roof reinforcement are connected through their rear edge portion and front edge portion, and further the fixing plate and the above-described both (the connecting reinforcement and the roof reinforcement) are connected, the light-weight and high-rigidity performance can be attained and particularly the vehicle-width-direction rigidity against the side collision can be increased, by effectively connecting the upper end portion of the center pillar and the end portion, in the vehicle width direction, of the roof reinforcement which are even offset from each other in the vehicle longitudinal direction.

In an embodiment of the present invention, the roof reinforcement is provided with a front-extension flange portion extending forward from an outboard end portion of the roof reinforcement, and a closed cross section extending in the vehicle width direction is formed by the front-extension flange portion and the rear edge portion of the connecting reinforcement.

According to this embodiment, since the closed cross section is formed by the front-extension flange portion of the roof reinforcement and the rear edge portion of the connecting reinforcement, the roof reinforcement and the connecting reinforcement are integrated. Further, the forming of the closed section extending in the vehicle width direction can increase the vertical-direction bending rigidity and also improve the efficiency of the vehicle-width-direction load transmission, so that the light-weight and high-rigidity performance can be attained.

In another embodiment of the present invention, the roof reinforcement is fixedly interposed vertically between the fixing plate and the connecting reinforcement at a position of the rear edge portion of the sun roof opening.

According to this embodiment, since the roof reinforcement is fixedly interposed vertically between the fixing plate and the connecting reinforcement, the high rigidity can be further attained through integration of the three members.

In another embodiment of the present invention, the roof side rail comprises an outer panel and at least one of a roof side rail reinforcement having a higher rigidity than the outer panel and an inner panel connected to the outer panel via a flange portion, an outboard end portion of the connecting reinforcement faces, in the vehicle width direction, the roof side rail reinforcement or the flange portion, and an outboard end portion of the roof reinforcement is positioned above and spaced apart from the roof side rail reinforcement or the flange portion.

According to this embodiment, since the outboard end portion of the connecting reinforcement faces, in the vehicle width direction, the roof side rail reinforcement or the flange portion which are a high rigidity portion of the roof side rail, the efficiency of the load transmission in the vehicle width direction can be increased. Further, since the outboard end portion of the roof reinforcement is positioned above and spaced apart from the roof side rail reinforcement or the flange portion, the outboard end portion of the roof reinforcement having the first sectional shape can be provided to extend straightly or curve smoothly along the shape of the roof panel in the vehicle width direction regardless of the level (height) of the roof side rail reinforcement or the flange portion, so that the vertical bending rigidity can be increased. Accordingly, the efficiency of the load transmission in the vehicle width direction is so increased that a light-weight and high-rigidity can be provided properly.

In another embodiment of the present invention, an outboard end portion of the connecting reinforcement is connected, via a connecting member, to a connection portion of the roof side rail and the center pillar or the center pillar.

According to this embodiment, the efficiency of the load transmission, in the vehicle width direction, between the connecting reinforcement and the center pillar can be increased.

Additionally, the first sectional shape of the roof reinforcement and the second sectional shape of the connecting reinforcement may be configured to be an uneven sectional shape, respectively, and the depth of the respective uneven sectional shapes of the first and second sectional shapes may be configured such that the depth of the first sectional shape is shallower than that of the second sectional shape.

Other features, aspects, and advantages of the present invention will become apparent from the following description which refers to the accompanying drawings.

DETAILED DESCRIPTION OF THE INVENTION

Figure 1:
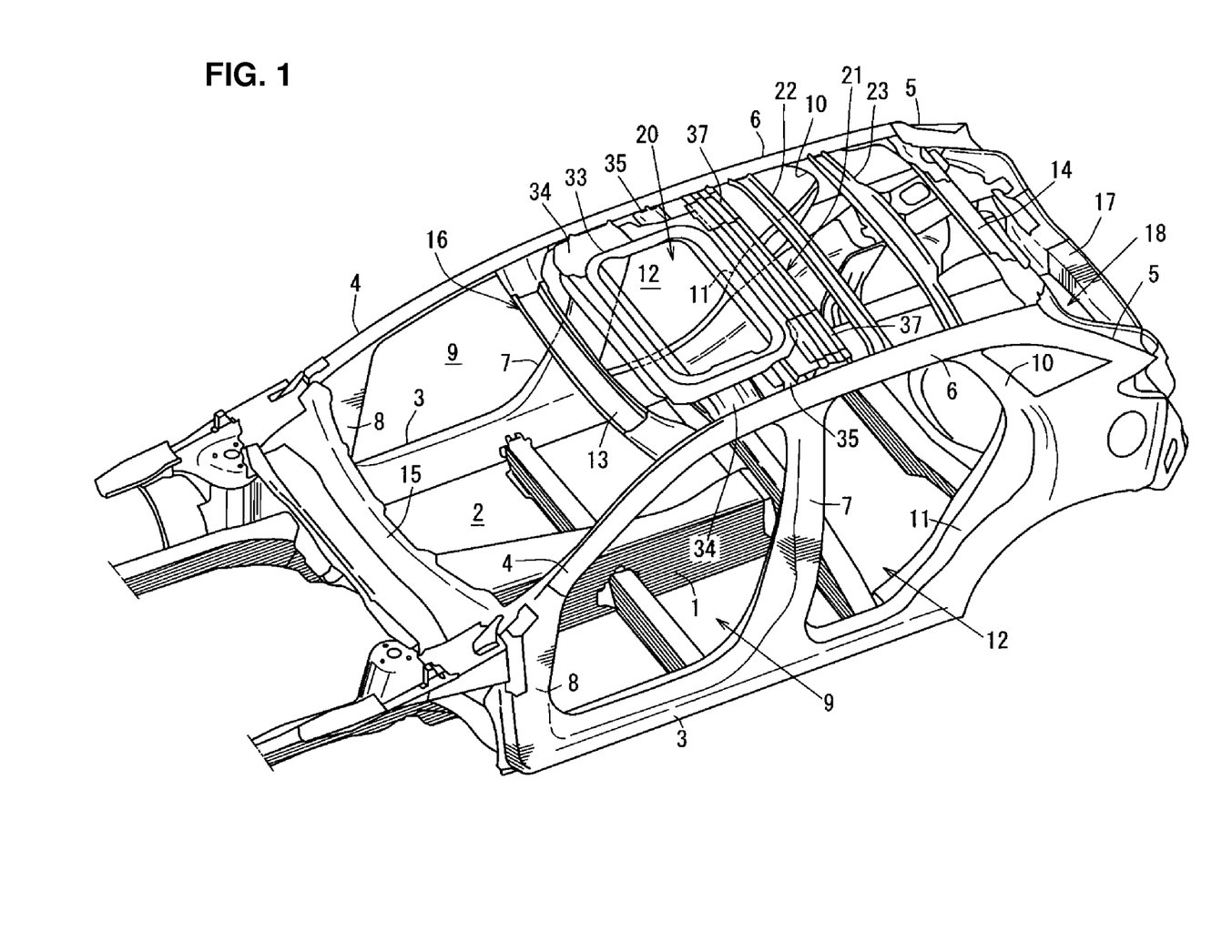
FIG. 1 is a perspective view showing an upper vehicle-body structure of an automotive vehicle provided with a sun roof of the present invention.
Figure 2:
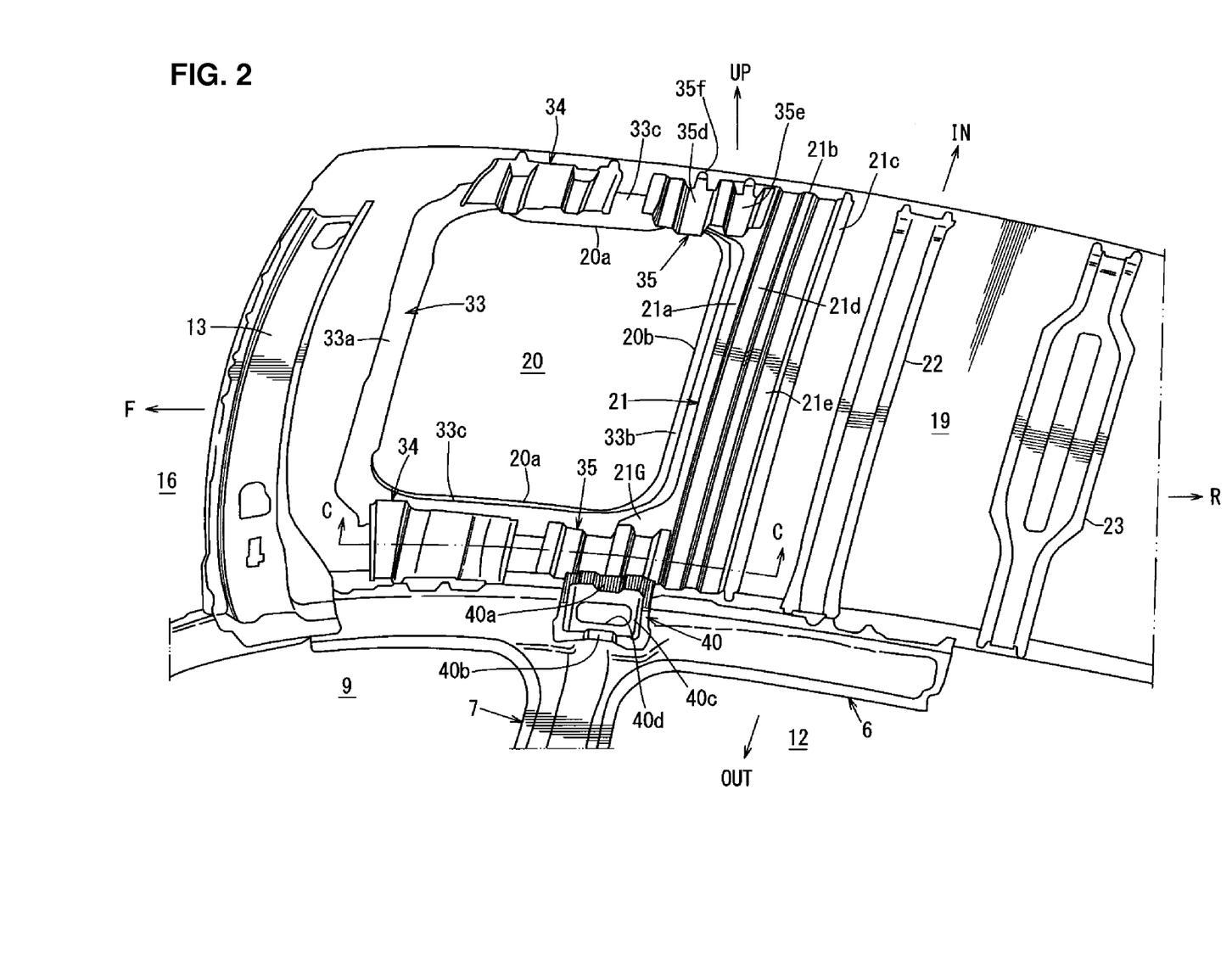
FIG. 2 is a perspective view showing the upper vehicle-body structure, when viewed upward from an inside of a vehicle compartment.

Hereinafter, an embodiment of the present invention will be described referring to the accompanying drawings. Figures show an upper vehicle-body structure of an automotive vehicle provided with a sun roof. FIG. 1 is a perspective view showing a vehicle-body structure of a substantially whole part of the vehicle including the upper vehicle-body structure, and FIG. 2 is a perspective view showing the upper vehicle-body structure, when viewed upward from an inside of a vehicle compartment.

In FIG. 1, a pair of side sills 3, 3 which extend in a vehicle longitudinal direction and have a closed cross section, respectively, are provided at right-and-left both end portions, in a vehicle width direction, of a floor panel 2, with which a tunnel portion 1 is integrated or formed integrally. Meanwhile, a pair of roof side rails 6, 6 which extend in the vehicle longitudinal direction and have the closed cross section are provided between a pair of front pillars 4 and a pair of rear pillars 5 which are positioned on a pair of vehicle-body side portions. There is provided a center pillar 7 as a vehicle-body reinforcing member which vertically connects a longitudinal middle portion of the roof side rail 6 and a longitudinal middle portion of the side sill 3. The center pillar 7 extends downward from the roof side rail 6. In other words, the center pillar 7 extends upward from the side sill 3.

A door opening portion 9 for ingress/egress of a front-seat passenger is formed by enclosing of a hinge pillar 8 which extends vertically at an outboard end portion of a dash lower panel (dash panel) and has the closed cross section, the front pillar 4, the roof side rail 6, the center pillar 7, and the side sill 3. A door opening portion 12 for ingress/egress of a rear-seat passenger is formed by enclosing of the center pillar 7, the roof side rail 6, a middle pillar 10 (a so-called quarter pillar), a wheel house portion 11, and the side sill 3. These door opening portions 9, 12 are configured to be open or closed with front and rear doors, not illustrated, respectively.

Herein, the above-described center pillar 7 is provided at a position just beside a seat back of a front seat, not illustrated, or slightly forward of this position for the purpose of providing the preferable ingress/egress of the front-seat passenger and protection of the front-seat passenger against a vehicle side collision.

Further, there are provided a front header 13 and a rear header 14 which laterally interconnect the pair of right-and-left roof side rails 6, 6 at front and rear positions of a roof portion, a windshield-glass arrangement space 16 is formed by enclosing of the pair of right-and-left front pillars 4, 4, the front header 13, and a cowl portion 15, and a rear baggage-room opening 18 is formed by enclosing of the pair of right-and-left rear pillars 5, 5, the rear header 14, and a rear head portion 17.

As shown in FIGS. 1 and 2, a sun roof opening 20 is provided between the pair of right-and-left roof side rails 6, 6 at a position of a roof panel 19 which vertically corresponds to the front seat (not illustrated). The sun roof opening 20 is formed in a rectangular shape, and right-and-left edge portions 20a, 20a of the sun roof opening 20 are spaced apart from the roof side rails 6 toward an inboard side (i.e., toward an inward side in the vehicle width direction).

Further, as shown in FIGS. 1 and 2, the rear edge portion 20b of the sun roof opening 20 is positioned rearward of an upper end portion of the center pillar 7, and a roof reinforcement 21 which extends in the vehicle width direction and has a specified first sectional shape (an uneven sectional shape described later) is provided at a position just behind the sun roof opening 20.

As shown in FIGS. 1 and 2, other roof reinforcements 22, 23 which extend in the vehicle width direction are provided roughly in parallel to each other between the roof reinforcement 21 and the rear header 14. These roof reinforcements 21, 22, 23 are fixedly joined to a lower face of the roof panel 19 by means of an adhesive, not illustrated, and extend in the vehicle width direction along the lower face of the roof panel 19 and fixedly connected to the roof side rails 6, 6 at their both end portions, respectively.

Figure 3:
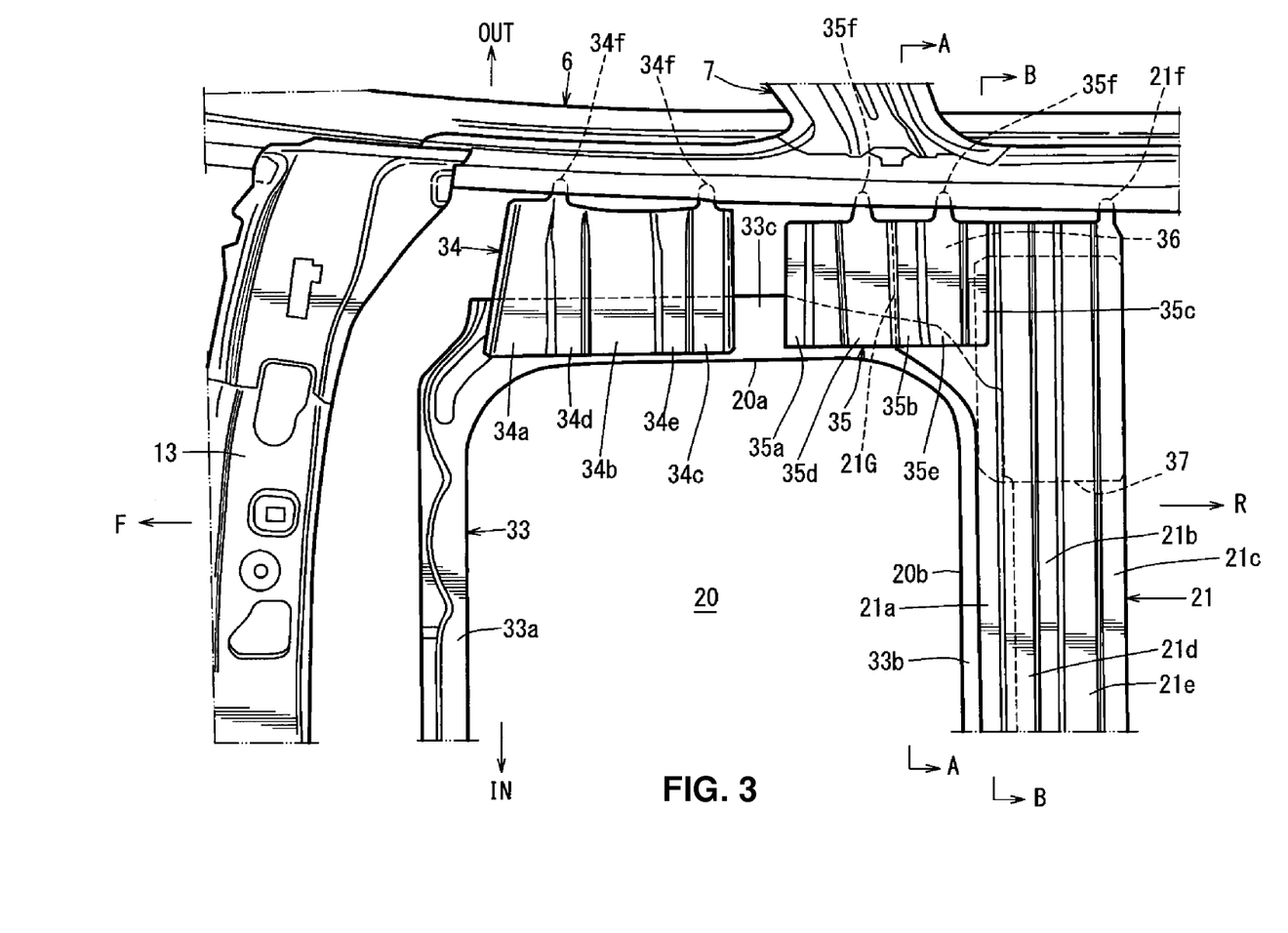
FIG. 3 is a bottom view showing the upper vehicle-body structure of the automotive vehicle.
Figure 4:
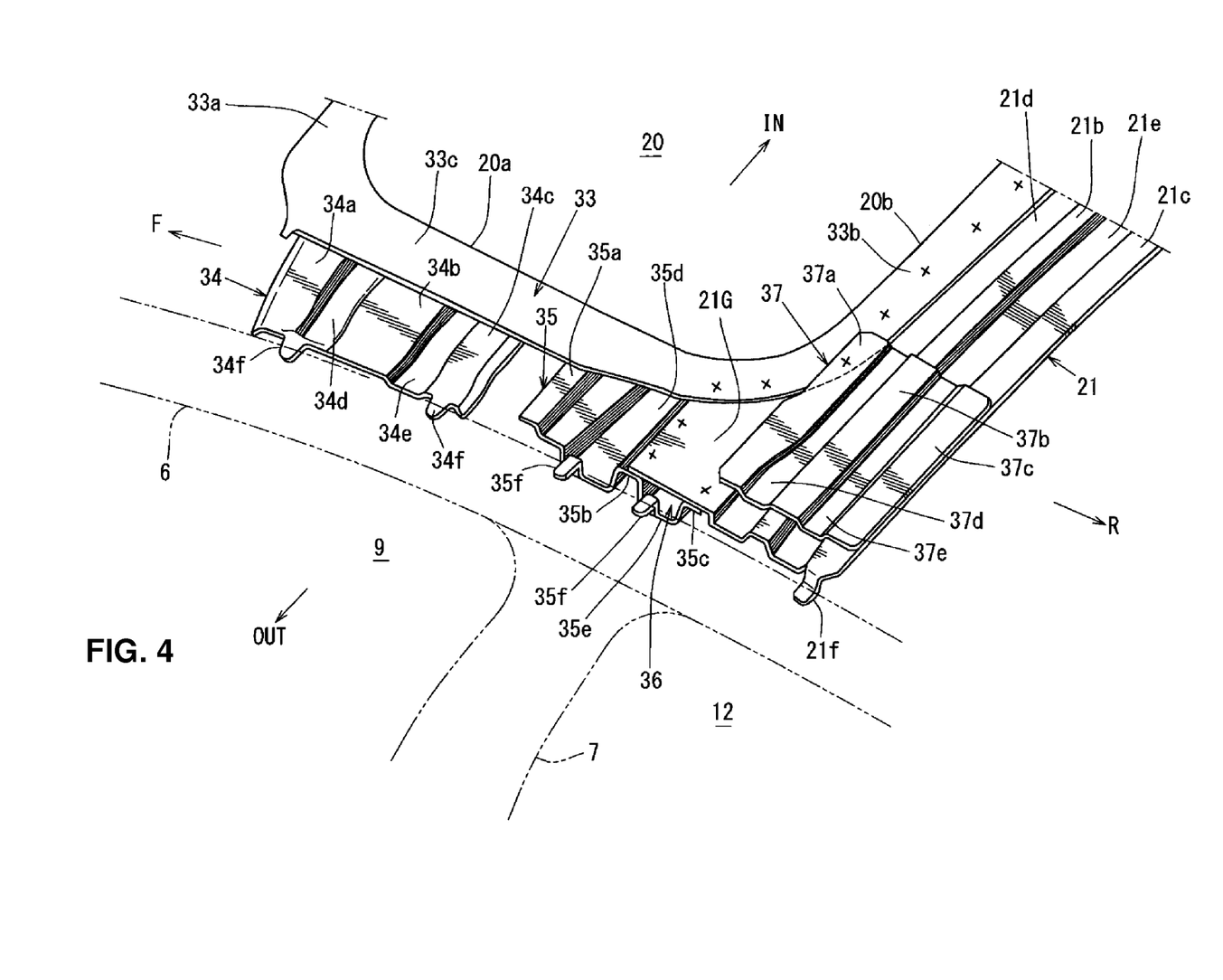
FIG. 4 is a major-part perspective view showing the upper vehicle-body structure.
Figure 5:
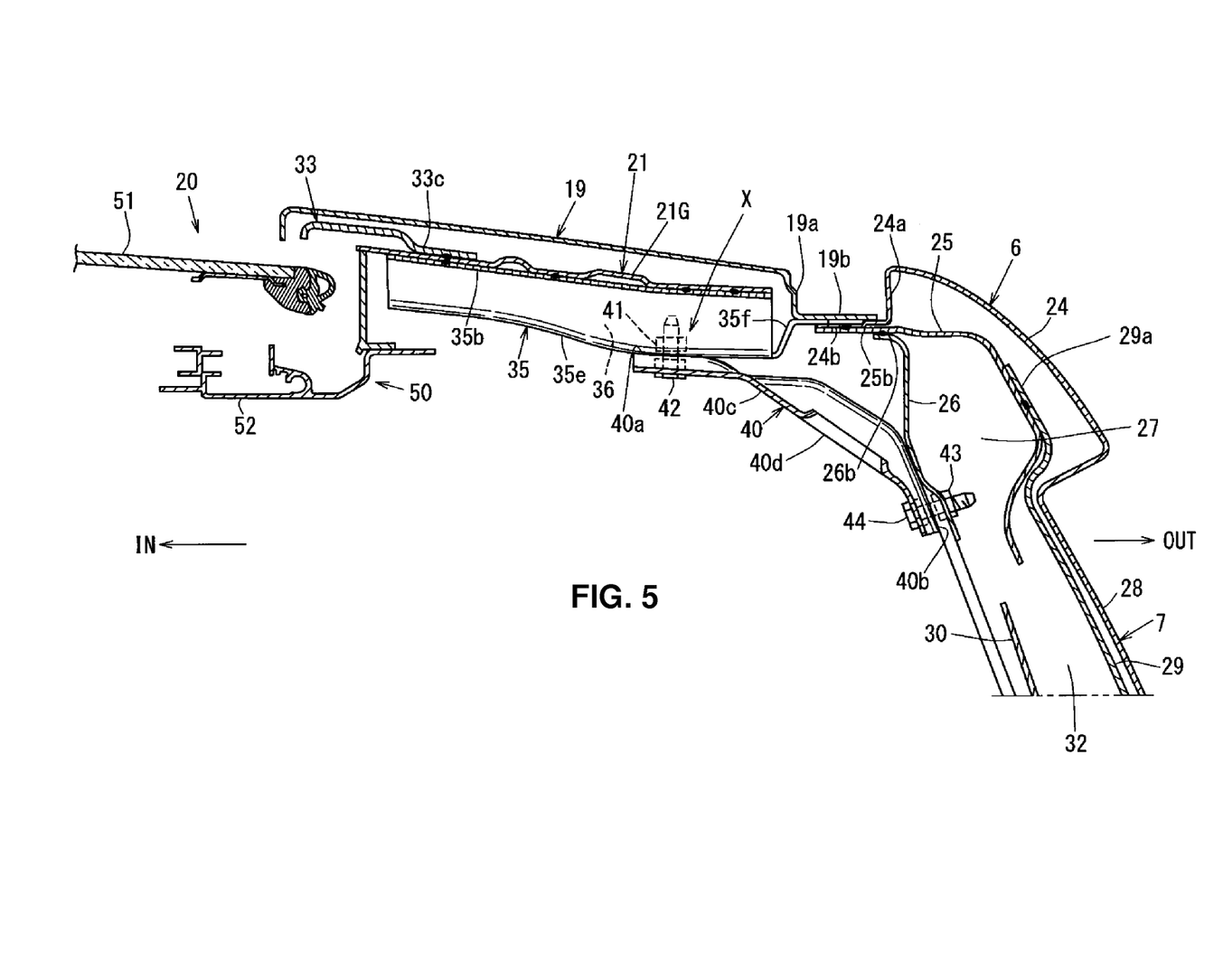
FIG. 5 is a sectional view taken along line A-A of FIG. 3.
Figure 6:
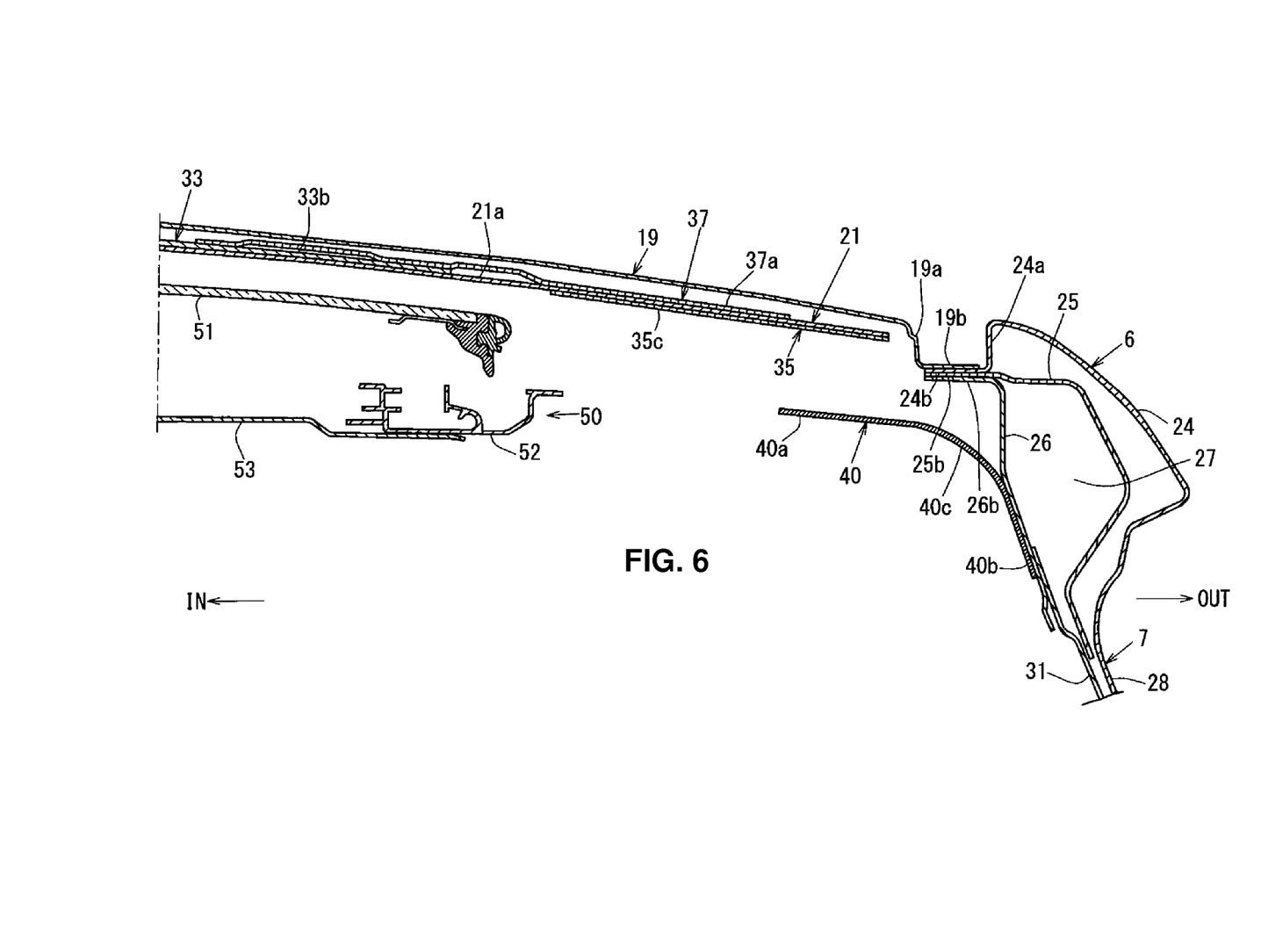
FIG. 6 is a sectional view taken along line B-B of FIG. 3.
Figure 7:
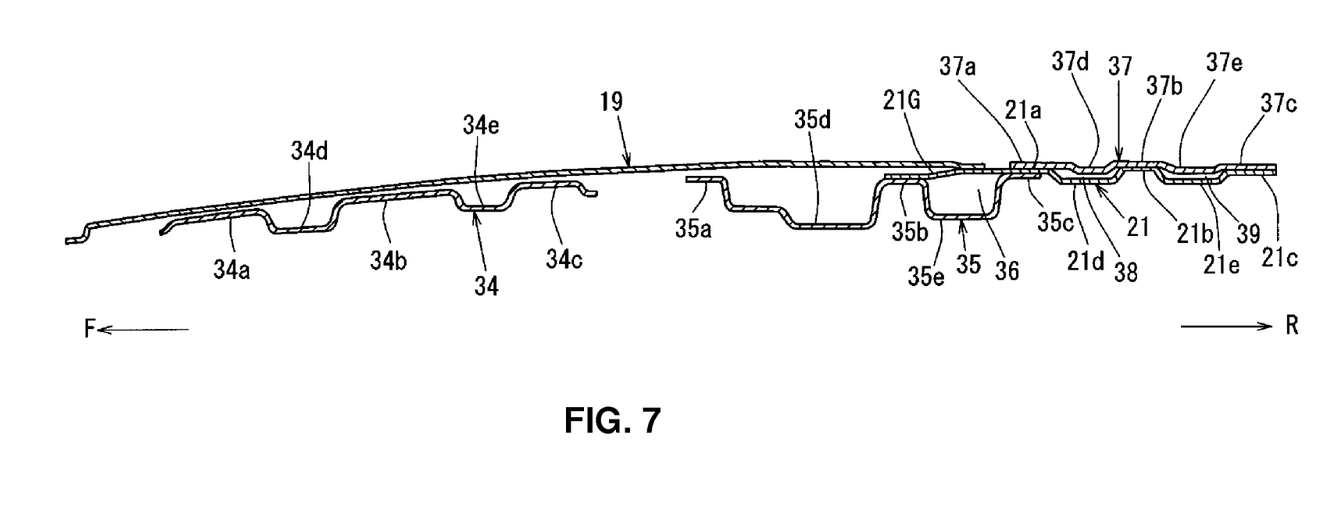
FIG. 7 is a sectional view taken along line C-C of FIG. 2.

FIG. 3 is a bottom view showing the upper vehicle-body structure of the automotive vehicle, FIG. 4 is a major-part perspective view showing the upper vehicle-body structure, FIG. 5 is a sectional view taken along line A-A of FIG. 3, FIG. 6 is a sectional view taken along line B-B of FIG. 3, and FIG. 7 is a sectional view taken along line C-C of FIG. 2.

As shown in FIGS. 5 and 6, the roof side rail 6 is a vehicle-body reinforcing member, which comprises a roof side rail outer 24, a roof side rail reinforcement 25 and a roof side rail inner 26, and has a closed cross section 27 extending in the vehicle longitudinal direction. The roof side rail outer 24 includes an inboard-side vertical wall 24a and a flange portion 24b which extend inward in the vehicle width direction from a lower end of the vertical wall 24a, the roof side rail reinforcement 25 includes a flange portion 25b which extends inward in the vehicle width direction, and the roof side rail inner 26 includes a flange portion 26b at its upper end which bends inward in the vehicle width direction. As shown in FIGS. 5 and 6, the flanges 24b, 25b, 26b are fixedly welded together.

As shown in FIGS. 5 and 6, the center pillar 7 is a vehicle-body reinforcing member, which comprises a center pillar outer 28, a center pillar reinforcement outer 29, a center pillar reinforcement inner 30 and a center pillar inner 30, and has a closed cross section 32 extending vertically. An upper portion of the closed cross section 32 is continuous to the closed cross section 27. Further, an upper portion 29a of the center pillar reinforcement outer 29 extends upward up to an outboard face portion of the roof side rail reinforcement 25, and this extension portion 29a is fixedly welded to the outboard face portion of the roof side rail reinforcement 25.

As shown in FIGS. 5 and 6, the center pillar outer 28 is formed integrally with the roof side rail outer 24, and the both 28, 24 form a body side outer panel.

Further, as shown in FIG. 6, an upper portion of the center pillar inner 31 is fixedly joined to a lower portion of the roof side rail inner 26. The both 31, 26 may be integrated alternatively.

As shown in FIGS. 5 and 6, a vertical wall 19a which extends downward and a flange portion 19b which extends outward from a lower end of the vertical wall 19a are provided at an end portion, in the vehicle width direction, of the roof panel 19, and the flange portion 19b is fixedly joined to the flange portion 24b of the roof side rail outer 24.

As shown in FIGS. 3 and 4, there are provided front-and-rear connecting reinforcements 34, 35 (so-called fixing reinforcements) which connect a fixing plate 33, which is a window frame member to reinforce the above-described sun roof opening 20, and the roof side rail 6. The fixing plate 33 comprises a front side portion 33a, a rear side portion 33b, and right-and-left side portions 33c, 33c, and is formed in a rectangular shape in a plan view (i.e., when viewed from above).

Further, the rear connecting reinforcement 35 is provided at a position corresponding to the center pillar 7, i.e., at a position which matches the upper end portion of the center pillar 7 in the vehicle longitudinal direction, and the front connecting reinforcement 34 is provided between the rear connecting reinforcement 35 and the front header 13.

As shown in FIGS. 3, 4 and 7, the front connecting reinforcement 34 includes upper face portions 34a, 34b, 34c and plural (two: in the present embodiment) recess groove portions 34d, 34e which are spaced apart from each other and extend in the vehicle width direction such that it has an uneven sectional shape. The front connecting reinforcement 34 further includes attachment pieces 34f, 34f which are fixedly joined to the flange portion 19b. The front connecting reinforcement 34 extends in the vehicle width direction roughly horizontally and connects the fixing plate 33 and the roof side rail 6.

As shown in FIGS. 3, 4, 7 and 8, the rear connecting reinforcement 35 located forward and below the roof reinforcement 21, and this connecting reinforcement 35 includes, as shown in these figures, upper face portions 35a, 35b, 35c and plural (two: in the present embodiment) recess groove portions 35d, 35e which are spaced apart from each other and extend in the vehicle width direction such that it has an uneven sectional shape (a specified second sectional shape). The rear connecting reinforcement 35 further includes attachment pieces 35f, 35f which are fixedly joined to the flange portion 19b. The rear connecting reinforcement 35 extends in the vehicle width direction roughly horizontally and connects the fixing plate 33 and the roof side rail 6.

As shown in FIGS. 3, 4 and 7, the roof reinforcement 21 includes upper face portions 21a, 21b, 21c and plural (two: in the present embodiment) recess groove portions 21d, 21e which are spaced apart from each other and extend in the vehicle width direction such that it has an uneven sectional shape (a specified first sectional shape). The roof reinforcement 21 further includes an attachment piece 21f which is fixedly joined to the flange portion 19b. The roof reinforcement 21 extends in the vehicle width direction roughly horizontally at a position just behind the sun roof opening 21 and connects the right-and-left roof side rails 6, 6.

As shown in FIG. 7, the depth of the grooves of the recess groove portions 21d, 21e of the roof reinforcement 21 is set to be shallower than that of the grooves of the recess groove portions 35d, 35e of the connecting reinforcement 35, so that a longitudinal slide space for a window glass of the sun roof and a vertical space in a vehicle compartment are ensured sufficiently.

As shown in FIGS. 4 and 7, the roof reinforcement 21 integrally has a front-extension flange portion 21G (hereafter, referred to as "extension flange" simply) which extends forward from its outboard end portion. This extension flange 21G is fixedly joined to a rear edge portion of the connecting reinforcement 35, specifically to the upper face portions 35b, 35c, and the extension flange 21G and the recess groove portion 35e of the connecting reinforcement 35 form together a closed cross section 36 which extends in the vehicle width direction roughly horizontally. This closed cross section 36 is formed at a position which matches the upper end portion of the center pillar 7 in the vehicle longitudinal direction as shown in FIGS. 3 and 4. More specifically, the closed cross section 36 is formed at a position which faces the upper portion of the center pillar reinforcement outer 29 in the vehicle width direction.

Accordingly, the roof reinforcement 21 and the connecting reinforcement 35 are integrated, and the above-described closed cross section 36 extending in the vehicle width direction increases the vertical-direction bending rigidity and also improves the efficiency of the vehicle-width-direction load transmission, so that the light-weight and high-rigidity performance can be attained. Moreover, as described above, the rear edge portion of the connecting reinforcement 35 and the front edge portion (see the extension flange 21G, specifically) of the roof reinforcement 21, and as shown in FIGS. 3 and 4, the inboard edge portion of the connecting reinforcement 35 and the front edge portion of the roof reinforcement 21 are connected via the above-described fixing plate 33.

Specifically, as shown in FIGS. 3 and 6, the upper face portion 21a of the roof reinforcement 21 and an inboard edge portion of the extension flange 21G are fixedly joined to the rear side portion 33b and a corner portion between the rear side portion 33b and the side portion 33c of the fixing plate 33, and inboard edge portions of the respective upper face portions 35a, 35b of the connecting reinforcement 35 are fixedly joined to the side portion 33c of the fixing plate 33 and the corner portion between the side portion 33c and the rear side portion 33b.

As described, the present embodiment is configured such that by connecting the rear edge portion of the connecting reinforcement 35 and the front edge portion of the roof reinforcement 21 and also connecting the inboard edge portion of the connecting reinforcement 35 and the front edge portion of the roof reinforcement 21 via the fixing plate 33, the roof reinforcement 21 and the connecting reinforcement 35 are arranged straightly in the vehicle width direction, without providing a bending structure of the roof reinforcement and its groove portion which appears in the conventional structure. Further, by connecting the connecting reinforcement 35 and the roof reinforcement 21, which are arranged at different positions, at their rear and front edge portions and also connecting the fixing plate 33 and the above-described both 35, 21, even if the respective positions of the upper end portion of the center pillar 7 and the end portion, in the vehicle width direction, of the roof reinforcement 21 are offset from each other in the vehicle longitudinal direction and in the vertical direction, these members (i.e., the center pillar 7 and the roof reinforcement 21) are effectively connected, so that the light-weight and high-rigidity performance can be attained, and particularly the vehicle-width-direction rigidity against the side collision can be improved.

Further, as shown in FIG. 5 of the sectional view taken along line A-A of FIG. 3, the roof reinforcement 21 (specifically, the extension flange 21G) is fixedly interposed vertically between the fixing plate 33 and the connecting reinforcement 35 at the position of the rear edge portion of the sun roof opening 20.

In the present embodiment, as shown in FIG. 5, a rear portion of the side portion 33c of the fixing plate 33, the upper face portion 35b of the connecting reinforcement 35, and the extension flange 21G of the roof reinforcement 21 are fixedly welded together. Thus, these three 33, 35, 21 are integrated so that the high-rigidity can be further improved.

Moreover, as shown in FIGS. 4 and 7, a reinforcing reinforcement 37 is provided to vertically overlap the outboard end portion of the roof reinforcement 21, a rear edge portion of the extension flange 21G of the roof reinforcement 21, and an outboard end portion of the rear side portion 33b of the fixing plate 33.

As shown in FIGS. 4 and 7, the above-described reinforcing reinforcement 37 includes upper face portions 37a, 37b, 37c and plural (two: in the present embodiment) recess groove portions 37d, 37e which are spaced apart from each other and extend in the vehicle width direction, and has an uneven sectional shape.

As shown in FIG. 7, the depth of the grooves of the recess groove portions 37d, 37e of the reinforcing reinforcement 37 is set to be shallower than that of the grooves of the recess groove portions 21d, 21e of the roof reinforcement 21. As shown in FIG. 4, the reinforcing reinforcement 37 is fixedly joined onto the respective elements 21G, 21, 33b, so that plural (two: in the present embodiment) closed cross section 38, 39 which extend in the vehicle width direction roughly horizontally are formed between the recess groove portions 37d, 37e and the recess groove portions 21d, 21e of the roof reinforcement 37. The above-described plural closed cross sections 38, 39 extending in the vehicle width direction increase the vertical-direction bending rigidity and also improve the efficiency of the vehicle-width-direction load transmission further.

Meanwhile, as shown in FIGS. 2, 5 and 6, a gusset 40 which obliquely connects the connecting reinforcement 35 and the roof side rail 6 is provided.

As shown in FIG. 5, the gusset 40 comprises an upper attachment portion 40a which is fastened to the recess groove portions 35d, 35e (see FIG. 8) of the connecting reinforcement 35 from below and a lower attachment portion 40b which is fastened to an overlapping portion (see FIG. 6) of the lower portion of the roof side rail inner 26 and the upper portion of the center pillar inner 31 from the inboard side. Bolts 42, 42 are fastened to nuts 41, 41 (see weld nuts shown in FIG. 8) which are previously fixedly welded to the recess groove portions 35d, 35e on the side of the connecting reinforcement 35. On the side of the roof side rail 6, bolts 44, 44 are fastened to nuts 43, 43 (the so-called weld nuts) which are previously fixedly welded to the roof side rail inner 26. Herein, a hole for light weight 40d is formed at a connection portion 40c where the upper attachment portion 40a and the lower attachment portion 40b of the gusset 40 are connected.

Figure 8:
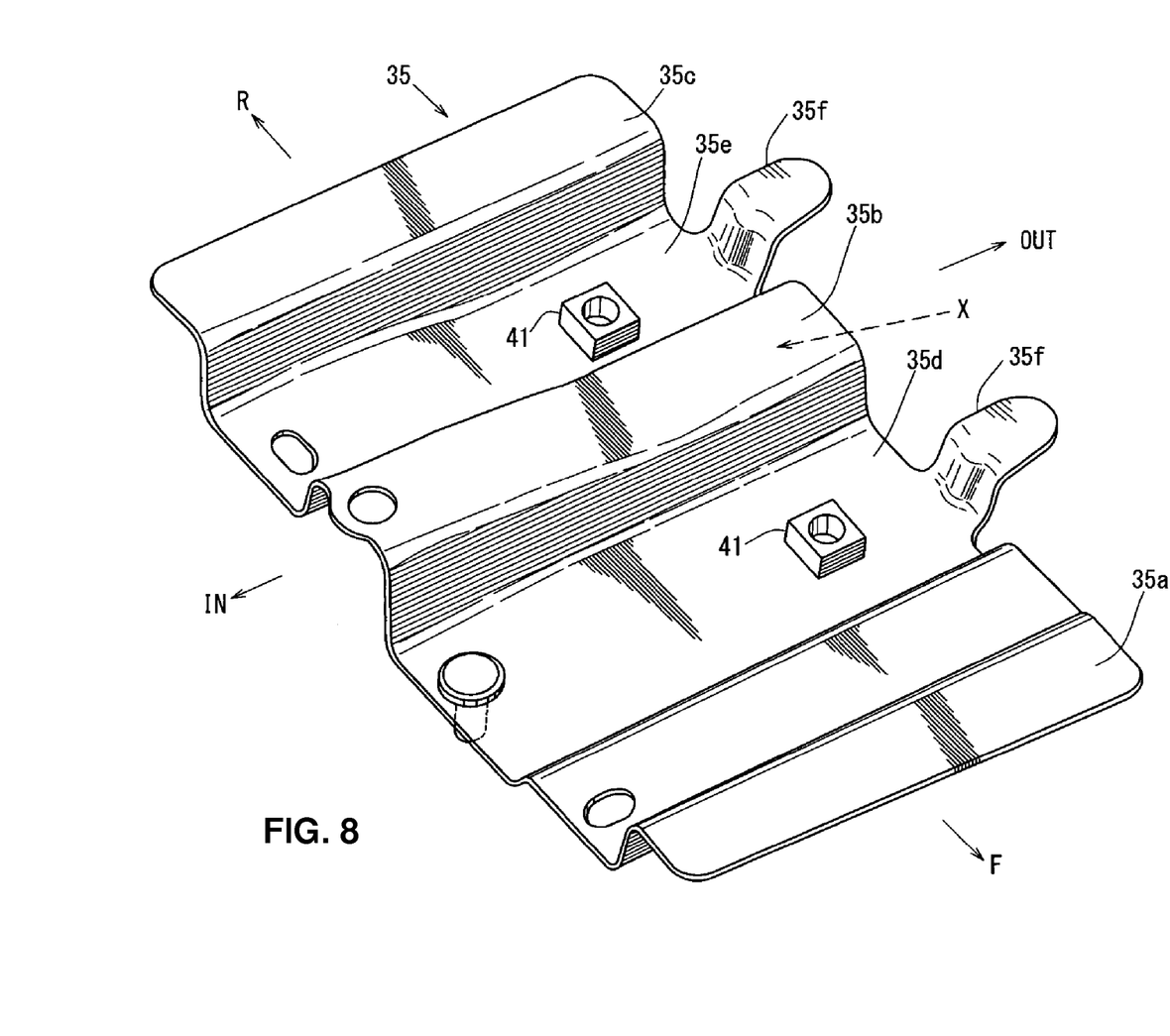
FIG. 8 is a perspective view showing a connecting reinforcement.

As shown in FIG. 8, joint portions with the nuts and bolts 42, 41 are provided to interpose an upward-protruding groove-shaped sectional portion between the nuts 41, 41, so that a closed cross section X which extends in the vehicle width direction is formed between the connecting reinforcement 35 and the upper attachment portion 40a of the gusset 40. Thereby, a sectional deformation of the connecting reinforcement 35 is prevented and the vehicle-width-direction rigidity is improved.

In FIGS. 5 and 6, reference character 50 denotes a sun roof unit, which comprises a window glass 51, a sun roof rail 52, a sun roof rear cross member 53 and others. In the figures, an arrow F shows a forward direction of the vehicle, an arrow R shows a rearward direction of the vehicle, and an arrow IN shows an inboard direction of the vehicle, and an arrow OUT shows an outboard direction of the vehicle.

As described above, the present embodiment is the upper vehicle-body structure of the automotive vehicle provided with the sun roof, in which the sun roof opening 20 is provided at the roof panel 19 arranged between the pair of right-and-left roof side rails 6, 6 extending in the vehicle longitudinal direction, the right-and-left side edge portions 20a, 20a of the sun roof opening 20 are spaced apart from the right-and-left roof side rails 6, 6, respectively, the center pillar 7 extends downward from the roof side rail 6, the rear edge portion 20b of the sun roof opening 20 is positioned rearward from the center pillar 7, and the roof reinforcement 21 extending in the vehicle width direction and having the specified first sectional shape (the uneven sectional shape) is provided at the position just behind the sun roof opening 20, the upper vehicle-body structure comprising the connecting reinforcement 35 interconnecting the fixing plate 33 which is the window-frame member to reinforce the sun roof opening 20 and the roof side rail 6 at the position corresponding to the center pillar 7, wherein the connecting reinforcement 35 is positioned forward of the roof reinforcement 21, has the specified second sectional shape (the uneven sectional shape), and extends in the vehicle width direction roughly horizontally, the rear edge portion of the connecting reinforcement 35 and the front edge portion of the roof reinforcement 21 are connected to each other, and the inboard edge portion of the connecting reinforcement 35 and the front edge portion of the roof reinforcement 21 are connected via the fixing plate 33 (see FIG. 4).

According to the present embodiment, since the roof reinforcement 21 and the connecting reinforcement 35 are arranged straightly in the vehicle width direction, the connecting reinforcement 35 and the roof reinforcement 21 are connected through their rear edge portion and front edge portion, and further the fixing plate 33 and the above-described both (the connecting reinforcement 35 and the roof reinforcement 21) are connected, the light-weight and high-rigidity performance can be attained and particularly the vehicle-width-direction rigidity against the side collision can be increased, by effectively connecting the upper end portion of the center pillar 7 and the end portion, in the vehicle width direction, of the roof reinforcement 21 which are even offset from each other in the vehicle longitudinal direction.

In the embodiment of the present invention, the roof reinforcement 21 is provided with the extension flange 21G extending forward from the outboard end portion of the roof reinforcement 21, and the closed cross section 36 extending in the vehicle width direction is formed by the extension flange 21G and the rear edge portion of the connecting reinforcement 35 (see FIGS. 4 and 7).

According to this embodiment, since the closed cross section 36 is formed by the extension flange 21G of the roof reinforcement 21 and the rear edge portion of the connecting reinforcement 35, the roof reinforcement 21 and the connecting reinforcement 35 are integrated. Further, the forming of the closed section 36 extending in the vehicle width direction can increase the vertical-direction bending rigidity and also improve the efficiency of the vehicle-width-direction load transmission, so that the light-weight and high-rigidity performance can be attained.

In the embodiment of the present invention, the roof reinforcement 21 is fixedly interposed vertically between the fixing plate 33 and the connecting reinforcement 35 at the position of the rear edge portion of the sun roof opening 20 (see FIG. 5).

According to this embodiment, since the roof reinforcement 21 is fixedly interposed vertically between the fixing plate 33 and the connecting reinforcement 35, the high rigidity can be further attained through integration of the three members 21, 33, 35.

The front-extension flange portion of the present invention corresponds to the extension flange 21G of the embodiment. However, the present invention should not be limited to the above-described embodiment. Further, while the left-side part of the vehicle has been described mainly as the upper vehicle-body structure of the automotive vehicle provided with the sun roof in the above-described embodiment, the vehicle-body structure is configured to be symmetrical or roughly symmetrical, so a right-side part of the vehicle is substantially the same as the left-side part. Moreover, while the roof reinforcement 21 and the connecting reinforcement 35 are configured to have the sectional shape provided with the groove portions extending in the vehicle width direction in the above-described embodiment, these reinforcements 21, 35 may be configured to have a sectional shape provided with flanges or ribs extending in the vehicle width direction or a closed cross section extending in the vehicle width direction, or the respective sectional shapes of these reinforcements may be configured to differ from each other.

Further, while the rear end portion of the connecting reinforcement 35 is joined (connected) to the lower face of the front end portion of the roof reinforcement 21 in the above-described embodiment, the rear end portion of the connecting reinforcement 35 may be joined (connected) to the upper face of the front end portion of the roof reinforcement 21.

What is claimed is:

1. An upper vehicle-body structure of an automotive vehicle provided with a sun roof, in which a sun roof opening is provided at a roof panel arranged between a pair of right-and-left roof side rails extending in a vehicle longitudinal direction, right-and-left side edge portions of the sun roof opening are spaced apart from the right-and-left roof side rails, respectively, a center pillar extends downward from the roof side rail, and a roof reinforcement extending in a vehicle width direction and having a specified first sectional shape is provided at a position just behind the sun roof opening, the upper vehicle-body structure comprising:

a connecting reinforcement interconnecting a fixing plate which is a window-frame member to reinforce the sun roof opening and the roof side rail at a position corresponding to the center pillar, wherein the connecting reinforcement is positioned forward of the roof reinforcement, has a specified second sectional shape, and extends in the vehicle width direction roughly horizontally, a rear edge portion of the connecting reinforcement and a front edge portion of the roof reinforcement are connected to each other, and an inboard edge portion of the connecting reinforcement and the front edge portion of the roof reinforcement are connected via said fixing plate.

2. The upper vehicle-body structure of the automotive vehicle provided with the sun roof of claim 1, wherein said roof reinforcement is provided with a front-extension flange portion extending forward from an outboard end portion of the roof reinforcement, and a closed cross section extending in the vehicle width direction is formed by said front-extension flange portion and the rear edge portion of said connecting reinforcement.

3. The upper vehicle-body structure of the automotive vehicle provided with the sun roof of claim 2, wherein said roof reinforcement is fixedly interposed vertically between said fixing plate and said connecting reinforcement at a position of a rear edge portion of said sun roof opening.

4. The upper vehicle-body structure of the automotive vehicle provided with the sun roof of claim 2, wherein said roof side rail comprises an outer panel and at least one of a roof side rail reinforcement having a higher rigidity than the outer panel and an inner panel connected to the outer panel via a flange portion, an outboard end portion of said connecting reinforcement faces, in the vehicle width direction, the roof side rail reinforcement or the flange portion, and an outboard end portion of the roof reinforcement is positioned above and spaced apart from the roof side rail reinforcement or the flange portion.

5. The upper vehicle-body structure of the automotive vehicle provided with the sun roof of claim 2, wherein an outboard end portion of said connecting reinforcement is connected, via a connecting member, to a connection portion of the roof side rail and the center pillar.

6. The upper vehicle-body structure of the automotive vehicle provided with the sun roof of claim 1, wherein said roof reinforcement is fixedly interposed vertically between said fixing plate and said connecting reinforcement at a position of a rear edge portion of said sun roof opening.

7. The upper vehicle-body structure of the automotive vehicle provided with the sun roof of claim 1, wherein said roof side rail comprises an outer panel and at least one of a roof side rail reinforcement having a higher rigidity than the outer panel and an inner panel connected to the outer panel via a flange portion, an outboard end portion of said connecting reinforcement faces, in the vehicle width direction, the roof side rail reinforcement or the flange portion, and an outboard end portion of the roof reinforcement is positioned above and spaced apart from the roof side rail reinforcement or the flange portion.

8. The upper vehicle-body structure of the automotive vehicle provided with the sun roof of claim 1, wherein an outboard end portion of said connecting reinforcement is connected, via a connecting member, to a connection portion of the roof side rail and the center pillar.

9. The upper vehicle-body structure of the automotive vehicle provided with the sun roof of claim 1, wherein the first sectional shape of said roof reinforcement and the second sectional shape of said connecting reinforcement are configured to be an uneven sectional shape, respectively, and the depth of the respective uneven sectional shapes of the first and second sectional shapes is configured such that the depth of the first sectional shape is shallower than that of the second sectional shape.

* * * * *